United States Patent [19]

Turchen

[11] 4,037,763
[45] July 26, 1977

[54] INSTRUMENT SUPPORT

[75] Inventor: Dick Turchen, Pearl River, N.Y.

[73] Assignee: Video Components, Inc., New York, N.Y.

[21] Appl. No.: 564,748

[22] Filed: Apr. 3, 1975

[51] Int. Cl.² .......................... G03B 17/00; A45F 3/08
[52] U.S. Cl. .................................... 224/5 V; 224/8 A;
    280/30; 280/47.24; 352/34; 352/243; 354/81;
    354/293
[58] Field of Search ................... A45C/13/38; 352/34,
    352/243; 354/81, 293; 224/8 A, 5 V, 25 A;
    280/30, 47.24, 47.27

[56] References Cited

U.S. PATENT DOCUMENTS

| 2,806,416 | 9/1957 | Jones | 352/243 |
| 3,550,997 | 12/1970 | Strand | 224/8 A |
| 3,900,140 | 8/1975 | Kelso | 224/5 V |

FOREIGN PATENT DOCUMENTS

| 6,522 | 3/1896 | United Kingdom | 224/8.1 |

Primary Examiner—Monroe H. Hayes
Attorney, Agent, or Firm—Henry Sternberg

[57] ABSTRACT

A portable body support for holding a camera and equipment accessory thereto, comprising a frame having a first portion adapted to be positioned adjacent the back of a user, said frame having a vertical length extending from the hip region of the user up to a level above the shoulders of the user, and a second portion comprising a pair of arms adaptable to extend forwardly from the upper end of said first frame portion at opposite sides, respectively, of the user's head. The support further comprises means for hingedly connecting the rear portions of said arms to the upper end of said first frame portion, a camera pod attached to the forward portions of said arms in the region in front of the user for supporting a camera in cantilevered relation to said first frame portion, a pair of shoulder straps for restraining said first frame portion adjacent the user's back, a belt adapted to wrap around the hip region of the user, whereby substantially all of the weight of the camera and its accessory equipment is transmitted to and supported by the hip region of the user, and means on said first frame portion for attachment thereto of the accessory equipment in a position adjacent the back of the user.

11 Claims, 6 Drawing Figures

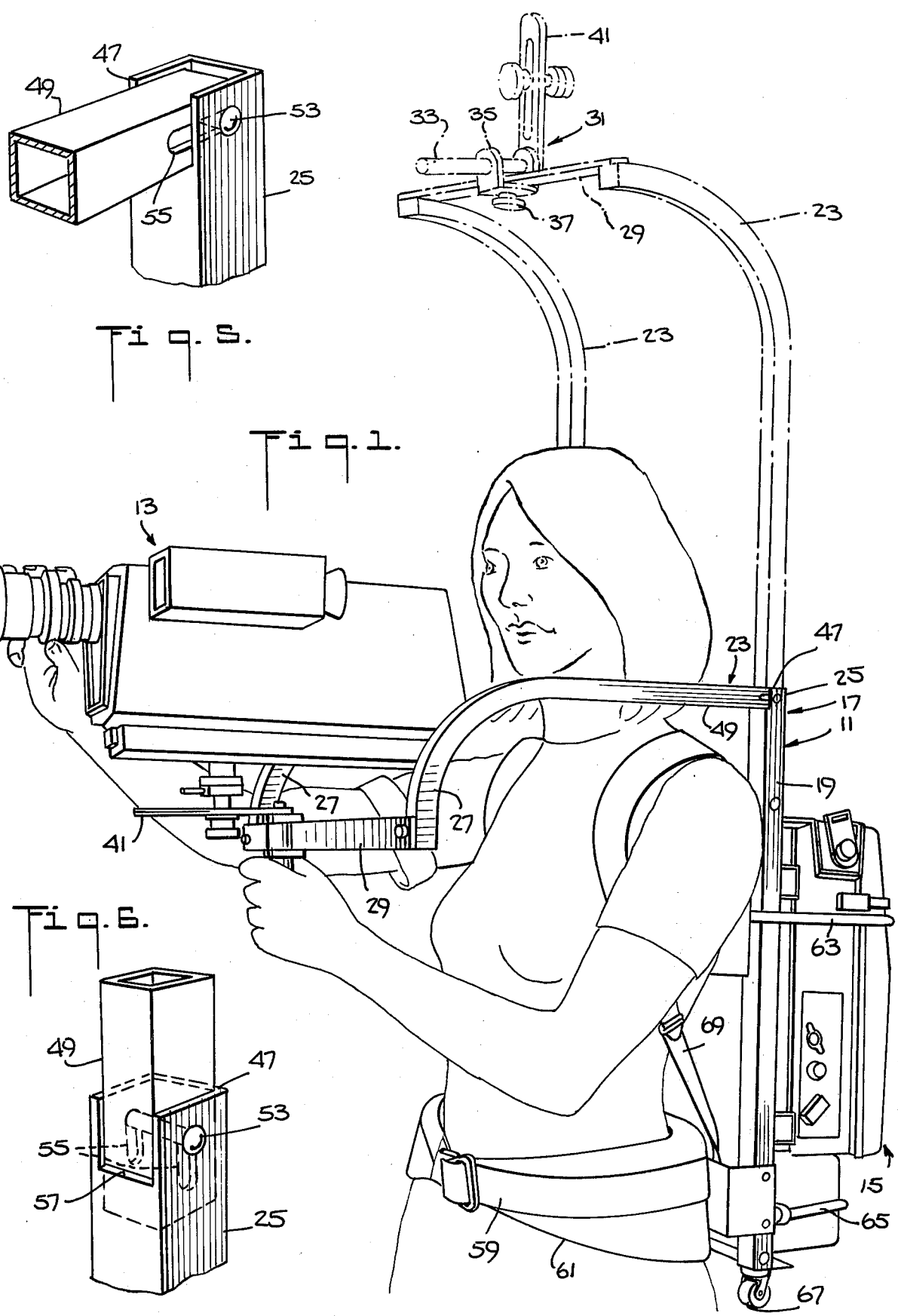

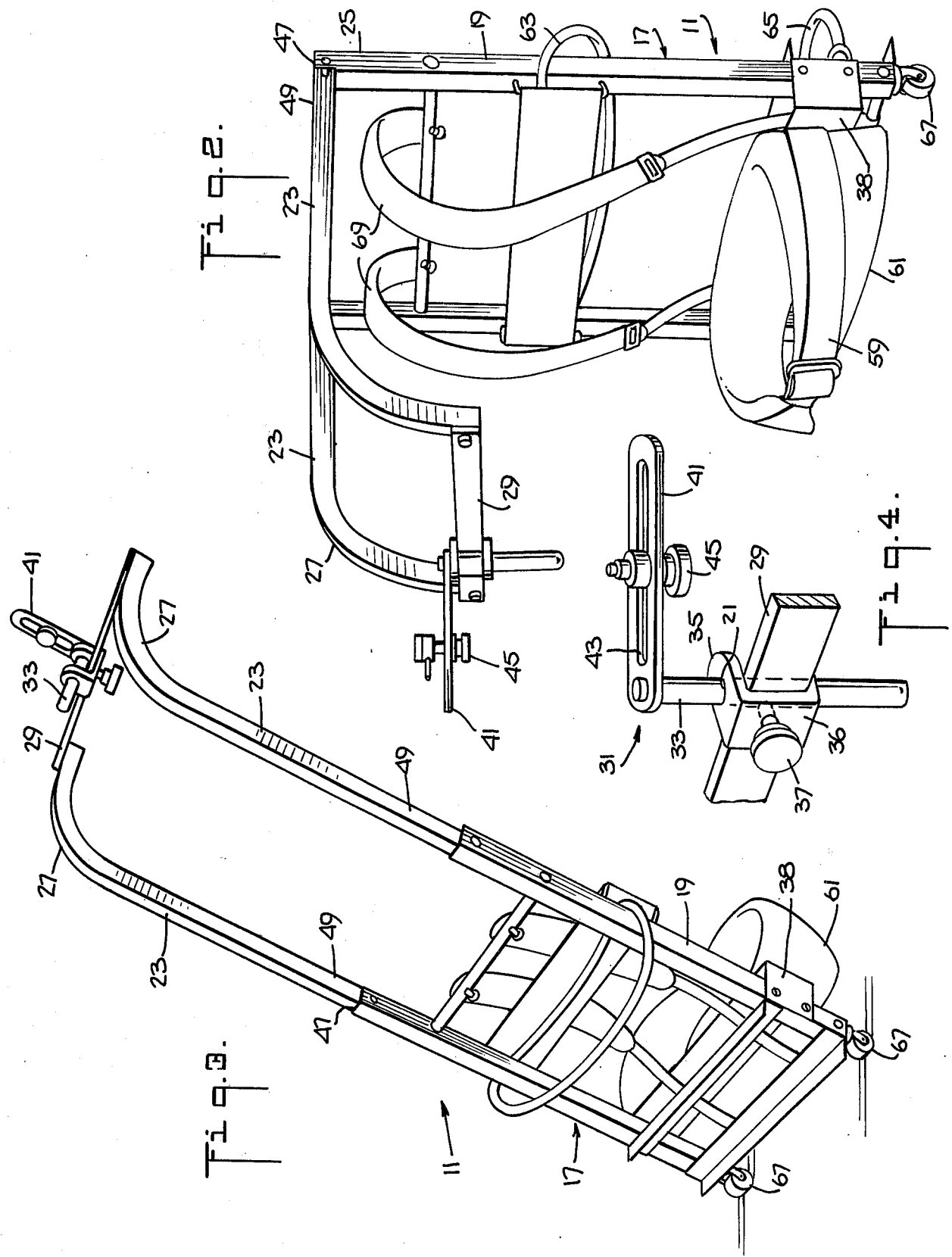

INSTRUMENT SUPPORT

BACKGROUND OF THE INVENTION

The instant invention relates to a camera support and more particularly to a support for holding camera and its accessory equipment on the body of the user while leaving the hands of the user free and yet permitting freedom of movement of the user's body.

There are many devices disclosed in the prior art for supporting a camera independently of holding a camera with the hands. However, there are several types of cameras, such as television cameras, which have associated with them heavy, accessory equipment. In using such a camera, which itself is both heavy and bulky and whose accessory equipment is also heavy and bulky, it would be desirable for the user of such a camera to be able to have a support for the camera and accessory equipment which not only holds the camera and the accessory equipment in such a way as to give the user maximum freedom of movement while it is being used for video purposes, but which may also be used as a cart to enable the user to roll the camera and accessory equipment on the ground when it is desired to transport the camera and equipment to or from a site.

It is therefore an object of the present invention to provide a camera support of the type just described. It is a further object of the invention to provide a camera support of the above type which so distributes the load of the camera and accessory equipment as to permit the latter to be relatively balanced for and aft of the user's body.

The instant invention therefore provides a camera support which not only provides freedom of movement during camera use but may be readily converted into a rolling cart. The camera support is charcterized by a structure which leaves the shoulders of the user substantially free of any weight of the camera or its accessory equipment, yet which permits such weight to be relatively balanced.

SUMMARY OF THE INVENTION

The instant invention provides a portable body support for holding a camera and the equipment accessory thereto. The support comprises a frame having a first portion adapted to be positioned adjacent the back of a user having a vertical length extending from the hip region of the user to a level above the shoulders of the user, and a second portion having a pair of arms adaptable to extend forwardly from the upper end of said first frame portion at opposite sides, respectively, of the user's head. The support further comprises means for hingedly connecting the rear portion of said arms to the upper end of said first frame portion, pod means attached to the forward portion of said arms in the region in front of the user for supporting a camera, whereby said camera is cantilevered from said first frame portion, a shoulder strap for retaining said first frame portion adjacent the user's back so that said camera will move together with and is repositioned in response to movement of the user's body, and a belt adapted to wrap around the hip region of the user for transmitting substantially all of the weight of the camera and its accessory equipment to the hip region of the user, and means on said first frame portion for attachment thereto of the accessory equipment in a position adjacent the back of the user to act among others, as a counterweight to the weight of the camera.

BRIEF DESCRIPTION OF THE DRAWINGS

FIG. 1 is a perspective view of the camera support of the instant invention in position on a user thereof, together with a camera and its accessory equipment and showing, in dashed lines, the arms in upright condition i.e. when not in use;

FIG. 2 is a perspective view of the camera support as it would appear when being used for video purposes;

FIG. 3 is a perspective view of the camera support as it would appear when being used as a rolling cart;

FIG. 4 is an enlarged, perspective view of the adjustable pod for supporting camera;

FIG. 5 is an enlarged, perspective view of the hinge connection of the frame of the camera support as it appears in FIG. 2; and FIG. 6 is an enlarged, perspective view of the same hinge connection shown in FIG. 5 as it appears in FIG. 3.

DESCRIPTION OF THE PREFERRED EMBODIMENT

In describing the preferred embodiment of the instant invention, reference is made to the drawings, wherein FIG. 1 depicts a portable body support generally designated 11 for holding a television camera 13 and its accessory equipment 15, which may include a video tape recorder, a camera control unit and a power supply. The body support 11 comprises a frame generallty designated 17 having a first portion 19 which is rectangular and adapted to be positioned adjacent the back of a user. The rectangular frame portion 19 includes a vertical length extending from the hip region of the user up to a level above the shoulders of the user. The frame 17 also includes a second portion comprising a pair of arms 23 which are adaptable to extend forwardly from the upper ends 25 of the rectangular frame portion 19 at opposite sides of the user's head. The forward portions 27 of the arms 23 extend downwardly and are joined by cross bar 29. Attached to the cross bar 29 is a pod generally designated 31 (see FIG. 4). The pod 31 includes a shaft 33 which can be moved up and down in a pair of openings 21 in flanges 35 of a U-shaped clamp 36 and can be adjusted to any height by means of a set screw 37 which is threadedly received in clamp 36 and which seats on the cross bar 29. The pod 31 further comprises a bar 41 which is fixed to the shaft 33 for rotational adjustment together therewith. The bar 41 includes a slot 43 in which a bolt 45 is slidable for attachment to the camera 13. Thus, the camera 13 may be fixed in any desired vertical and horizontal position by adjustment of bolt 45 along slot 43, by rotation of bar 41 with shaft 33, by raising or lowering of shaft 33 with respect to clamp 36 and by sliding of clamp 36 along cross bar 29. Thereby the camera can be positioned at any desired location with respect to the user's head. Since cross bar 29 passes between the set screw 37 on bracket 36 and the shaft 33, tightening of set screw 37 will result in locking of the shaft 33 against cross bar 29 in any desired combination of rotational, horizontal and vertical positions of shaft 33.

The support 11 further comprises a hinge connection 47 which connects the rear portions 49 of the arms 23 to the upper ends 25 of the rectangular frame portion 19. As best seen in FIGS. 5 and 6, the rear portions 49 of the arms 23 are hingedly connected to the upper ends 25 of the rectangular frame portion 19 by means of a pin 53 secured to the upper ends 25. Each of the rear portions 49 includes channels 55 which are slidable about the pin 53. The length of the channels 55 is such that the rear portions 49 seat securely within the upper ends 25 when the arms 23 are swung upwardly to the position illustrated in FIG. 3. The channels 53 permit the arms 23 to retract a short distance into the tubular upper ends 25. However it may be desirable to include a locking device, such as a wing-nut (not shown) for example at one head of the pin 53, to lock the rear portions 49 into the desired position. The upper ends 25 of the rectangular frame portion 19 include a cut-out portion 57 into which the rear portions 49 of the arms 23 seat when the arms 23 are lowered into a position, FIG. 2, of use for video purposes.

The body support 11 also comprises a belt 59 secured to a cushioning support 61. The belt 59, adapted to wrap around the hip region of the user, affixes the rectangular frame portion 19 to the user's body so that substantially all the weight of the camera and its accessory equipment is transmitted to and supported by the hip region of the user. The rectangular frame portion 19 also includes belts 63 and 65 for attachment to the rectangular frame portion 19 of the accessory equipment 15 in a position adjacent the back of the user.

Secured to the bottom of the rectangular frame portion 19 are a pair of wheels 67 which permit the camera support 11 to be rolled about as a cart, as seen in FIG. 3. When the camera support 11 is being used as a cart, the arms 23 are positioned to comprise a substantially straight extension of the rectangular frame portion 19, and the forward portions 27 of the arms 23 function as handles for the cart.

The camera support 11 also includes a pair of adjustable shoulder straps 69, each having one end connected to the upper part of the rectangular frame 19 and the other end connected to bracket 38 at the lower part of the rectangular frame 19. Bracket 38 is preferably arcuate so as to conform to the curvature of the user's back.

As seen in FIG. 1, camera support 11 is structured so that the camera 13 is cantilevered with respect to the portion 19 of the frame carrying the accessory equipment, and the user's body is therefore substantially free, except for the hip region which supports substantially all the weight of both the camera and the accessory equipment. Thus the shoulders carry only a small portion of the load and act primarily to maintain the frame portion 19 closely adjacent the back of the user so that the entire frame, camera, etc. will move as a unit in response to movement of the user's torso. The user's arms and hands are left completely free for the user to operate the controls of camera 13. The accessory equipment 15 is heavier than the camera 13, and is positioned, therefore, in closer proximity to the user's body, in back, than the camera in front, whereby improved balancing is achieved.

The camera support frame 17 is preferably formed from aluminum, so as to reduce the weight resting on the user's hip region. However, the support 17 may also be formed from magnesium, plastic or fiberglass, among other materials.

It is also envisioned that the support of the instant invention may be used for other devices requiring positioning and alignment with the eye and heavy equipment accessory thereto such as a laser and an accessory power pack, a microwave dish and an accessory power pack, a light source and an accessory power pack, surveying equipment with an accessory power pack, or highly directional audio devices including, for example, a microphone which must be carefully aimed and an accessory pack including a power pack and, if desired, a tape recorder or transmitter.

Various modifications and changes are contemplated and may obviously be resorted to, without departing from the spirit or scope of the invention as hereinafter defined by the appended claims.

What is claimed is :

1. A portable support frame for holding a camera and equipment accessory thereto, comprising:
    a frame having a first portion adapted to be positioned adjacent the back of a user, said first portion having a vertical length extending from the hip region of the user up to a level above the shoulders of the user, and a second portion having a pair of arms adaptable to extend forwardly from the upper end of said first frame portion at opposite sides, respectively, of the user's head above the level of the user's shoulders,
    a cross-bar connecting the pair of arms;
    means for hingedly connecting the rear portions of said arms to the upper end of said first frame portion for pivotal movement of said arms in only a vertical plane between a first position in which said arms are generally horizontal and a second position in which said arms are generally vertical;
    pod means attached to the cross-bar in the region in front of the user for supporting a camera, where said camera is cantilevered from said first frame portion;
    a belt adapted to wrap around the hip region of the user for supportion substantially all of the weight of the camera and its accessory equipment on the hip of the user; and
    means on said first frame portion for attachment thereto of the accessory equipment in a position adjacent the back of the user.

2. The support of claim 1, wherein the forward portions of said pair of arms extend downwardly when the remaining portions of the arms are in a horizontal plane.

3. The support of claim 2, wherein the pod means includes adjustment means for positioning the camera horizontally, means for lowering and raising the camera vertically and means for locating the camera closer to or further away from the User's head, said positioning means being located below the level of the chin of the user such that positioning means can be adjusted to move the camera to a position in which the camera viewer will be located at about eye level of the user.

4. The support of claim 3, wherein said pair of arms are pivotable with respect to said first frame portion to a position in which they comprise a substantially straight extension of said first frame portion.

5. The support of claim 4 further comprising at least one wheel attached to the bottom of the first frame portion, whereby the camera support may be rolled about as a cart, said downwardly extending forward arm portions functioning as handles.

6. The support of claim 4, further comprising a pair of wheels attached to the bottom of the first frame portion, whereby the camera support may be rolled about as a cart, said downwardly extending forward arm portions functioning as handles.

7. The support of claim 6, wherein the first frame portion is substantially rectangular.

8. The support of claim 7, wherein the belt is connected to the lower part of said rectangular frame.

9. The support of claim 8, further comprising a pair of shoulder straps, each having one end connected to the upper part of the rectangular frame and the other end connected to the lower part of the rectangular frame.

10. The support of claim 9, wherein the accessory equipment is heavier than the camera and is positioned in closer proximity to the user's body in back than the camera is in front, whereby improved balancing is achieved.

11. A portable support frame for holding a device requiring alignment with the eye of a user and equipment accessory thereto, comprising:

A frame having a first portion adapted to be positioned adjacent the back of a user, said first portion having a vertical length extending from the hip region of the user up to a level above the shoulders of the user, and a second portion having a pair of arms adaptable to extend forwardly from the upper end of said first frame portion at opposite sides, respectively, of the user's head above the level of the user's shoulders;

a cross-bar connecting the pair or arms;

means for hingedly connecting the rear portions of said arms to the upper end of said first frame portion for pivotal movement of said arms in only a vertical plane between a first position in which said arms are generally horizontal and a second position in which said arms are generally vertical;

pod means attached to the cross-bar in the region in front of the user for supporting said device, whereby said device is cantilevered from said first frame portion;

a belt adapted to wrap around the hip region of the user for supporting substantially all of the weight of the device and its accessory equipment on the hip region of the user; and means on said first frame portion for attachment thereto of the accessory equipment in a position adjacent the back of the user.

* * * * *

UNITED STATES PATENT AND TRADEMARK OFFICE
CERTIFICATE OF CORRECTION

PATENT NO. : 4,037,763
DATED : July 26, 1977
INVENTOR(S) : Dick Turchen

It is certified that error appears in the above-identified patent and that said Letters Patent are hereby corrected as shown below:

Column 4, line 28, for "where" read --whereby--;
Column 4, line 32, for "supportion" read --supporting--;
Column 4, line 34, before "of" read --region--;
Column 4, line 45, for "User's" read --user's--.
Column 5, line 14, for "A" read --a--.

Signed and Sealed this

Thirteenth Day of December 1977

[SEAL]

Attest:

RUTH C. MASON
Attesting Officer

LUTRELLE F. PARKER
Acting Commissioner of Patents and Trademarks